United States Patent
Lantz et al.

(10) Patent No.: US 11,004,164 B2
(45) Date of Patent: May 11, 2021

(54) SEARCHING FOR TRADEMARK VIOLATIONS IN CONTENT ITEMS DISTRIBUTED BY AN ONLINE SYSTEM

(71) Applicant: Facebook, Inc., Menlo Park, CA (US)

(72) Inventors: Sean M. Lantz, Austin, TX (US); Zackary Daniel Darwin, Austin, TX (US); Ulziibayar Otgonbaatar, San Francisco, CA (US); Michal Zgliczynski, London (GB); Willy Huang, Pasadena, CA (US); Eric Tauseng Wei, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 494 days.

(21) Appl. No.: 15/796,659

(22) Filed: Oct. 27, 2017

(65) Prior Publication Data
US 2019/0130508 A1    May 2, 2019

(51) Int. Cl.
*G06Q 50/18* (2012.01)
*G06N 7/00* (2006.01)
(Continued)

(52) U.S. Cl.
CPC ....... *G06Q 50/184* (2013.01); *G06F 16/3329* (2019.01); *G06N 7/005* (2013.01); *G06N 20/00* (2019.01)

(58) Field of Classification Search
CPC .............. G06Q 50/184; G06Q 30/0185; G06F 16/3329; G06N 20/00; G06N 7/005
See application file for complete search history.

(56) References Cited

U.S. PATENT DOCUMENTS

| 5,765,152 A * | 6/1998 | Erickson | G06F 21/10 |
| 6,401,118 B1 * | 6/2002 | Thomas | G06F 21/10 |
| | | | 707/999.004 |

(Continued)

FOREIGN PATENT DOCUMENTS

| KR | 20090091192 A * | 8/2009 | G06F 21/10 |

OTHER PUBLICATIONS

USPTO, Basic Facts About Trademarks, Aug. 2019, accessed Nov. 27, 2019 (Year: 2019).*

(Continued)

*Primary Examiner* — Aryan E Weisenfeld
*Assistant Examiner* — Andrew Chase Lakhani
(74) *Attorney, Agent, or Firm* — Fenwick & West LLP

(57) ABSTRACT

An online system allows third-party systems to provide content for distribution to users. The online system allows trademark owners to search for content items that are likely to violate trademarks. The online system receives proof of the trademark registration from trademark owner's devices. The online system receives a search request for content items that are likely to violate a trademark. The online system ranks the content items that are likely to violate the input trademark based on various factors. One of the factors used for ranking the content items is a score generated by a machine learning based model that indicates a likelihood of violation of trademarks by a content item. The online system controls the rate of distribution of content items of a content provider based on information indicating whether the content provider violates trademarks, for example, by blocking distribution of content items by specific content providers.

16 Claims, 7 Drawing Sheets

(51) Int. Cl.
*G06N 20/00* (2019.01)
*G06F 16/332* (2019.01)

(56) References Cited

U.S. PATENT DOCUMENTS

| | | | | |
|---|---|---|---|---|
| 6,684,254 | B1* | 1/2004 | Dutta | G06F 16/955 |
| | | | | 709/229 |
| 6,856,977 | B1* | 2/2005 | Adelsbach | G06Q 30/06 |
| | | | | 380/200 |
| 7,266,704 | B2* | 9/2007 | Levy | G06F 21/10 |
| | | | | 713/193 |
| 7,707,224 | B2* | 4/2010 | Chastagnol | G06Q 30/06 |
| | | | | 707/783 |
| 8,370,949 | B2* | 2/2013 | Hagan | G06Q 30/02 |
| | | | | 705/14.47 |
| 8,601,596 | B2* | 12/2013 | Wu | G06F 21/10 |
| | | | | 726/26 |
| 10,387,889 | B1* | 8/2019 | Hanna | G06Q 50/01 |
| 10,419,477 | B2* | 9/2019 | Desai | H04L 63/1483 |
| 2003/0037010 | A1* | 2/2003 | Schmelzer | G06F 21/10 |
| | | | | 705/67 |
| 2004/0220903 | A1* | 11/2004 | Shah | G06F 16/955 |
| 2005/0246391 | A1* | 11/2005 | Gross | G06F 16/958 |
| 2007/0156757 | A1* | 7/2007 | Tang | G06F 16/951 |
| 2008/0033822 | A1* | 2/2008 | Merdinger | G06Q 30/0242 |
| | | | | 705/14.41 |
| 2008/0103849 | A1* | 5/2008 | Forman | G06K 9/6262 |
| | | | | 705/7.37 |
| 2008/0189263 | A1* | 8/2008 | Nagle | G06Q 30/018 |
| 2008/0228485 | A1* | 9/2008 | Owen | G06F 16/3343 |
| | | | | 704/254 |
| 2012/0144499 | A1* | 6/2012 | Tan | G06Q 10/00 |
| | | | | 726/26 |
| 2013/0152211 | A1* | 6/2013 | Wu | G06F 21/10 |
| | | | | 726/26 |
| 2013/0254179 | A1* | 9/2013 | Tan | G06F 16/951 |
| | | | | 707/706 |
| 2014/0129288 | A1* | 5/2014 | Eager | G06Q 30/0185 |
| | | | | 705/7.29 |
| 2015/0154720 | A1* | 6/2015 | Matkowsky | G06Q 50/184 |
| | | | | 705/310 |
| 2016/0055490 | A1* | 2/2016 | Keren | G06Q 30/00 |
| 2016/0253679 | A1* | 9/2016 | Venkatraman | G06Q 30/0185 |
| | | | | 705/310 |
| 2016/0260033 | A1* | 9/2016 | Keyngnaert | G06Q 10/063 |

OTHER PUBLICATIONS

Charles V. Trappey, et al, Intelligent trademark similarity analysis of image, spelling, and phonetic features using machine learning methodologies, Advanced Engineering Informatics, vol. 45, (http://www.sciencedirect.com/science/article/pii/S1474034620300896) (Year: 2020).*

* cited by examiner

SEARCHING FOR TRADEMARK VIOLATIONS IN CONTENT ITEMS DISTRIBUTED BY AN ONLINE SYSTEM

BACKGROUND

This disclosure relates generally to distribution of content by online systems, and in particular, to searching for and regulating trademark violations in content items distributed by online systems.

Online systems, such as social networking systems, allow users to connect to and communicate with other users of the online system. Users may create profiles on an online system that are tied to their identities and include information about the users, such as interests and demographic information. Presenting information to users of an online systems allows providers to gain public attention for products or services and to persuade online system users to take action regarding the business' products, services, opinions, or causes. As a result, companies of all sizes and backgrounds have flocked to provide content to users using such online systems.

However, with the proliferation of content providers to these systems, regulation of such content has grown increasingly inefficient, and entities promoting counterfeit content have grown more prominent. Current methods of screening for deceptive content are hindered by rudimentary screening techniques and cumbersome processes which prove to be ineffectual on a larger scale, especially given the rate at which these online systems have grown. Additionally, such systems lack effective methods of verifying whether a content provider legally has the rights in the trademarks that it was using, making establishing a viable screening process even more difficult.

SUMMARY

Embodiments allow users of an online system to search for content items provided to users via the online system, where the content items include trademark violations. The online system receives a request to perform a search for content items stored by the online system that are likely to violate a given trademark. The online system identifies search terms associated with the trademark and sends them to the client device requesting the search results. For example, the search terms may be obtained by performing optical character recognition on an image representing the trademark. The online system receives selections of one or more search terms from the client device and identifies search results matching the terms. Each search result comprises a content item that is likely to have trademark violations. The online system ranks the search results based on various factors.

The online system sends the search results for presentation to the client device. In an embodiment, the online system receives, from the trademark owner, a selection of content items confirming that the selected content items violate the trademark. The online system identifies a content provider of a content item violating the trademark and adds the content provider to a black list. The online system may block content items provided by the black-listed content provider from users of the online system.

In some embodiments, the online system eliminates content items of the content provider from search results returned to the trademark owner for subsequent searches. In some embodiments, the factors used for ranking search results include a measure of likelihood of a content item violating the trademark, where the measure is used for ranking the search results. In an embodiment, the online system determines the measure of likelihood of the content item violating the trademark using a prediction model trained using machine learning techniques.

The online system may rank the search results based on other factors, for example, a number of times the content item was presented to users of the online system. Another factor that may be considered is interactions performed by client devices with third party web sites responsive to viewing the content item that violates the trademark.

Figure 1:
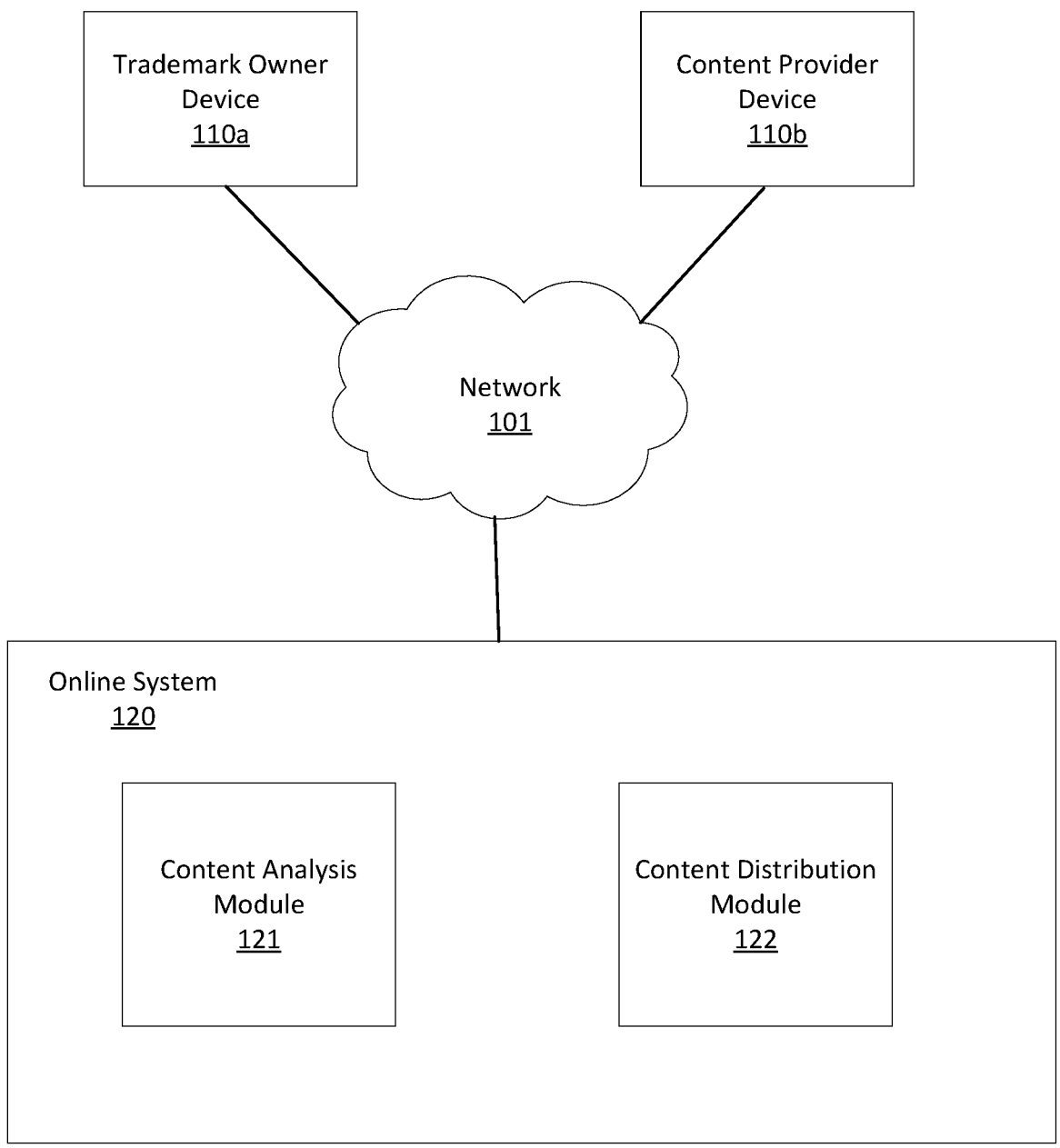
FIG. 1 is a high-level block diagram of a system environment, in accordance with an embodiment of the invention.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

Overview

An online system, such as a social networking system, is a popular medium for content providers to promote their content to users. However, within such systems of large volume, content providers promoting counterfeit goods or services often operate without detection to the detriment of trademark owners promoting content based on authenticated versions of those same goods. As a result, embodiments implement and enforce mechanisms of safeguarding and regulating such content, by allowing trademark owners to use their official trademark information to search for content using their trademark illegally, by performing refined text and image searching techniques to yield the most accurate results and suggestions.

As used herein, an "online system" includes a social networking system, a website external from the social networking system, an online service, a game or other application, a media item, or any other computing environment that requires parental authorization. The online service can be a portion of a website, an online application that is run on a website, or media items shown on a website. In some embodiments, the computing resource is a social networking system that provides users a way to connect, connect with content that they are interested in. Social networking systems allow users to consider, purchase, or view content in an easy and accessible manner.

A content provider who does legally hold the rights in a registered trademark is referred to herein as a "trademark owner." Any other content provider, fraudulent or legitimate, is referred to herein as "content providers" or simply "providers." Those who view this content through the online system are referred to herein as "users."

A "user" is a member of the online system network to whom content is provided. As discussed, a user is an individual or group of individuals to whom content is provided by the online system. A user may be an individual or an organization, for example, an enterprise represented by one or more individuals.

A "trademark owner device" or "trademark owner" is one example of the "other party" that interacts with the users of the online system. Trademark owner devices are those accessing accounts that legally retain the rights in the registered trademark in question. These are the entities who stand to experience a detriment should the aforementioned content regulations fail or be non-existent.

The online system may, in some cases, restrict trademark owners from performing searches pertaining to trademarks for which they are not registered. For example, if an authorized representative of Brand A logged in from a device and attempted to perform a search on the Brand B trademark, the online system would recognize that they are not registered owners of the Brand B trademark and prevent the search. If an entity has a registered trademark, but attempts to perform a search pertaining to a trademark to which they are not registered, that entity would not be considered a trademark owner device. Entities can be classified as trademark owners once they register the trademark of interest with the online system by way of offering and verifying the certification from the USPTO.

A content providing device is another example of the "other party" that interacts with users of the online system. Content providing devices are those that do not legally retain the rights in the registered trademark in question. These are the entities who stand to experience a financial gain should the aforementioned content regulations fail or be non-existent. These entities, lacking registration, risk being caught and facing repercussions consistent with the policies of the online system should they take advantage of a trademark registered under another entity. A content item found to be using a trademark without authorization may also be referred to as a content item with trademark violations, content item with counterfeit trademarks, fraudulent content item, content item with deceptive information, or unauthorized content item. Examples of possible trademark violations may include a content item that directly uses the trademark without authorization, uses an image or reference with a resemblance to the official trademark, or mimics a trademark owner's product without directly or indirectly using their logo.

System Architecture

FIG. 1 is a block diagram of one embodiment of a system environment 100. In the embodiment shown by FIG. 1, the system environment 100 includes a content-providing client device 110a, client device 110b, a network 101, and an online system 120. However, in other embodiments the system environment 100 may include different and/or additional components.

The devices 110a and 110b are one or more computing devices capable of receiving user input with data processing and data communication capabilities. Examples of devices 110 include desktop computers, laptop computers, portable computers, personal digital assistants, smart phones, or any other device including computing functionality and data communication capabilities. Devices 110 communicate with the online system 120 via the network 101. In one embodiment, a device 110a or 110b executes an application allowing a user of the trademark owner device 110a or content provider device 110b to interact with the online system 120.

Interactions between devices 110 and the online system 120 are typically performed via the network 101, which enables communication between devices 110 and the online system 120. In one embodiment, the network 101 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 101 may also utilize dedicated, custom, or private communication links. The network 101 may comprise any combination of local area and/or wide area networks, using both wired and wireless communication systems.

The online system 120 provides the medium for content distribution from content providers to users, as further described below. The online system 120 receives data from trademark owner device 110a and content provider device 110b via the network 101 and processes the received data. In one embodiment, the social networking system 120 includes a content analysis module 121 and a content distribution module 124.

The content analysis module 121 receives information from the trademark owner device. The information may include, but is not limited to, required trademark registration info and corresponding search parameters. The content analysis module 121 verifies whether a trademark is a valid trademark owned by the trademark owner. The content analysis module 121 receives trademarks from a trademark owner device and performs searches based on the trademark to identify content items that are not owned or provided by the trademark owner but use the trademark and are therefore deceptively using the trademark. The content analysis module 121 provides the search results to the trademark owner device 110a and receives conformation, whether a content item deceptively or fraudulently includes the trademark of the trademark owner. Accordingly, the content analysis module 121 may add the user accounts of the providers of the deceptive content item in a blacklist.

The content distribution module 122 selects and sends content items relevant to users of the online system to client devices 110 of the users. The content distribution module 122 facilitates the display of authorized information on the user's profiles. However, fraudulent content is recorded and contained from users' profiles, while the online system may determine appropriate repercussions. Accordingly, the content distribution module 122 blocks content items that include fraudulent use of trademarks and withholds such content from users. In an embodiment, the content distribution module 122 withholds from users all content provided by a user account that is blacklisted due to previous fraudulent use of trademarks. Further details of the content analysis module 121 and content distribution module 122 are described below in conjunction with FIGS. 2-3.

Figure 2:
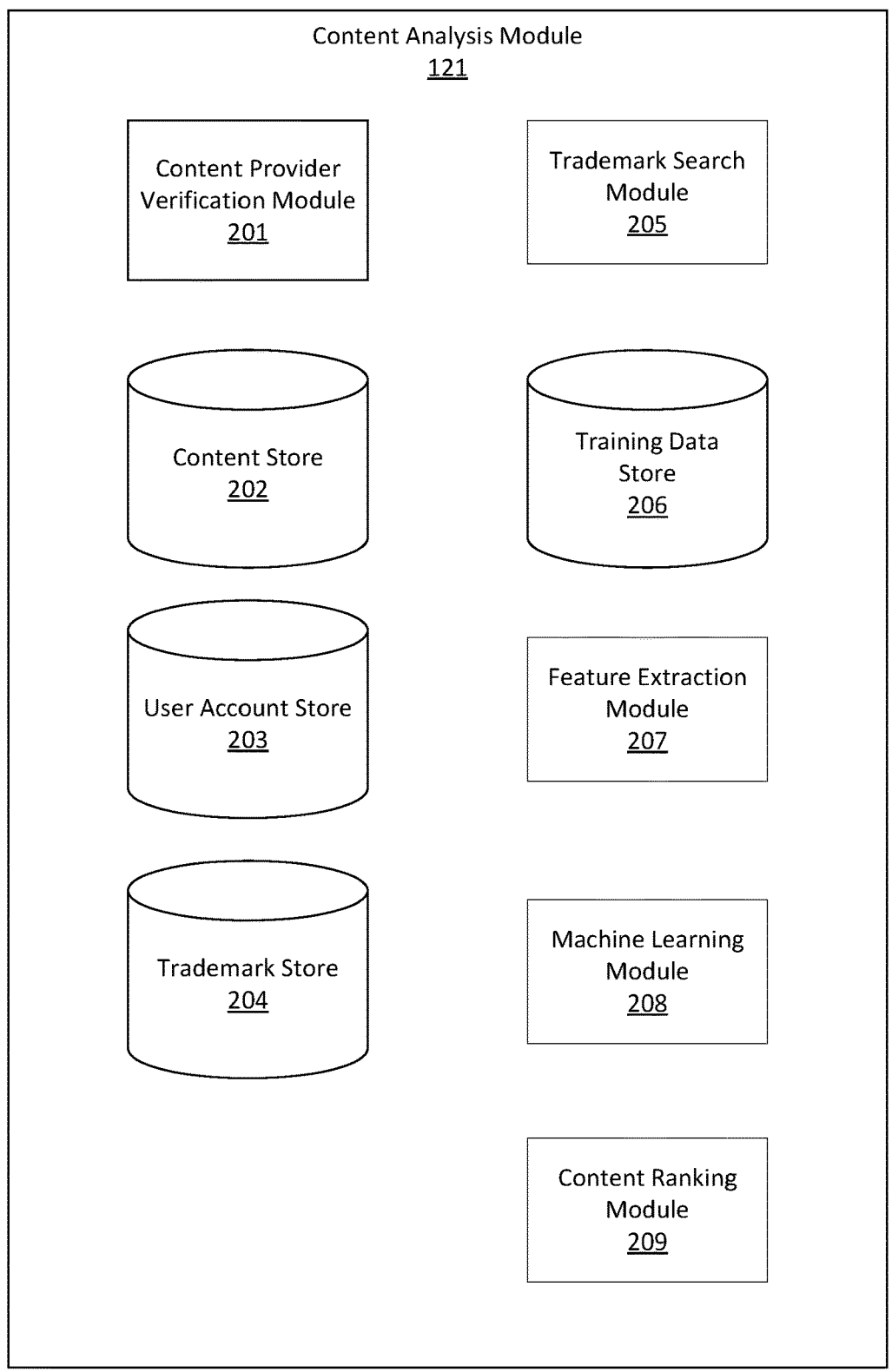
FIG. 2 is a high-level block diagram of the content provider system, in accordance with an embodiment of the invention.

FIG. 2 illustrates the system architecture of the content analysis module 121 according to an embodiment. The content analysis module 121 includes a content verification module 201, a content store 202, a user account store 203, a trademark store 204, a trademark search module 205, a training data store 206, a feature extraction module 207, a machine learning module 208, and a content-ranking module 209. In other embodiments, the content analysis module 121 may include more or fewer modules.

The content provider verification module 201 verifies that trademark owner is legally entitled to the rights in the trademark in question. The process executed by the content provider verification module 201 is described below in conjunction with FIG. 3.

The content store 202 stores content items received from users and from content providers. The content store 202 also stores metadata associated with each content item, for example, the user account of the user that provided the content, targeting criteria associated with the content that describe attributes of users to who the content should be directed, and so on.

In various embodiments, a content item includes various components capable of being identified and retrieved by the online system 120. Example components of a content item include: a title, text data, image data, audio data, video data, a landing page, a user associated with the content item, or any other suitable information. The online system 120 may retrieve one or more specific components of a content item for presentation in some embodiments. For example, the online system 120 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 120 logs interactions between users presented with the content item or with objects associated with the content item. Additionally, the online system 120 receives compensation from a user or content provider associated with content item as online system users perform interactions with a content item that satisfy the objective included in the content item.

The user account store 203 stores information describing various users of the online system. The user account store 203 also stores information describing content providers that provide content items stored in content store 202. In an embodiment, the user account store 203 maintains sets of user accounts identified as black list or white list. A black list includes user accounts that are determined to provide content that fraudulently uses trademarks that the user accounts are not authorized to use. Content items provided by a user account that is blacklisted may be withheld by the content distribution module 124 from users of the online system. A white list is determined to be an authorized account that is known to use trademarks legitimately. In an embodiment, the user account store 203 maintains black lists and white lists by storing metadata of user accounts including appropriate flags that mark the user account as black listed or white listed.

The trademark search module 205 takes the information held in the content analysis module 121 and generates appropriate search parameters as suggestions to trademark owners. A search parameter is also referred to herein as a search keyword or search term and comprises keywords/terms that may be provided as input for performing search. For example, if the trademark is a particular logo, the trademark search module 205 identifies keywords that are included in the logo, for example, by performing optical character recognition on the logo if the logo is an image. In one embodiment, a trademark owner registers one or more trademarks with the online system. The online system may use any of the trademarks as its own standalone search term. In an embodiment, the online system presents the registered trademarks to the trademark owner via a user interface and receives a selection of a particular trademark as a search term. In an embodiment, the trademark search module 205 identifies other search terms from information associated with the user account of the trademark owner in the online system. For example, the trademark search module 205 may identify a slogan associated with the trademark that is determined to occur with the trademark. In an embodiment, the online system receives search terms from a user, for example, a system administrator associated with the user account of the trademark owner. In an embodiment, the online system determines variations of the keywords describing a trademark that a fraudulent content provider would use. The online system determines variations of the trademark, for example, names that are very similar to the trademark that fraudulent content providers have used in the past and were identified by the trademark owner as fraudulent use of the trademark.

The online system receives from the trademark owner, selection of one or more search terms as appropriate search terms for use and uses these terms as input to perform a search of content contained in the online system 120. Information associated with the trademark, determined by the trademark owner, is cross-referenced with other content found in the online system. Using methods including, but not limited to, text and image searching of content using the trademark or relating to it would be compiled into a list of search results. For example, possible related information could entail an unofficial sale or promotion for counterfeit Brand X goods that is undercutting current prices or sales on those same goods being sold by official Brand X retailers. Further, for every profile with potentially suspect content, additional information is provided including links to other social media pages and websites through which that content is being promoted (i.e. other online accounts, website URL's, etc.).

The machine learning module 208 uses machine learning techniques to generate a prediction model configured to predict a likelihood (or probability) of a content item violating a trademark. The prediction model determines an output score based on a weighted aggregate of feature scores corresponding to various features extracted by the feature extraction module 207. In an embodiment, the machine learning module 209 determines weights of various features used by the prediction model based on training data stored in the training data store 206. The prediction model may invoked by the content ranking module 209 to rank content items. For example, content items with higher scores are ranked higher since they are more likely to be of interest to a trademark owner. In an embodiment, the prediction model comprises a set of weights that are used by the machine learning module 208 to determine a score for a given content item. In another embodiment, the prediction model comprises a set of weights as well as instructions for aggregating feature scores using the weights to determine the output score.

In some embodiments, the machine learning module 208 uses machine learning techniques including, for example, linear regression, decision trees, support vector machines, classifiers (e.g., a Naive Bayes classifier), fuzzy matching, and gradient boosting. For example, a classifier based machine learning model may classify a content item as either violating a trademark or not violating a trademark. The machine learning module is further described below in conjunction with FIG. 5.

The training data store 206 stores content items that are used by the machine learning module for training a prediction model. The feature extraction module 207 retrieves content items from the training data store, and extracts features used to train the prediction model. In one embodiment, the training data store 206 stores information describing content items that are known to violate trademarks and content items that are known to be authentic and corresponding labels indicating whether or not the content items violates a trademark.

Figure 5:
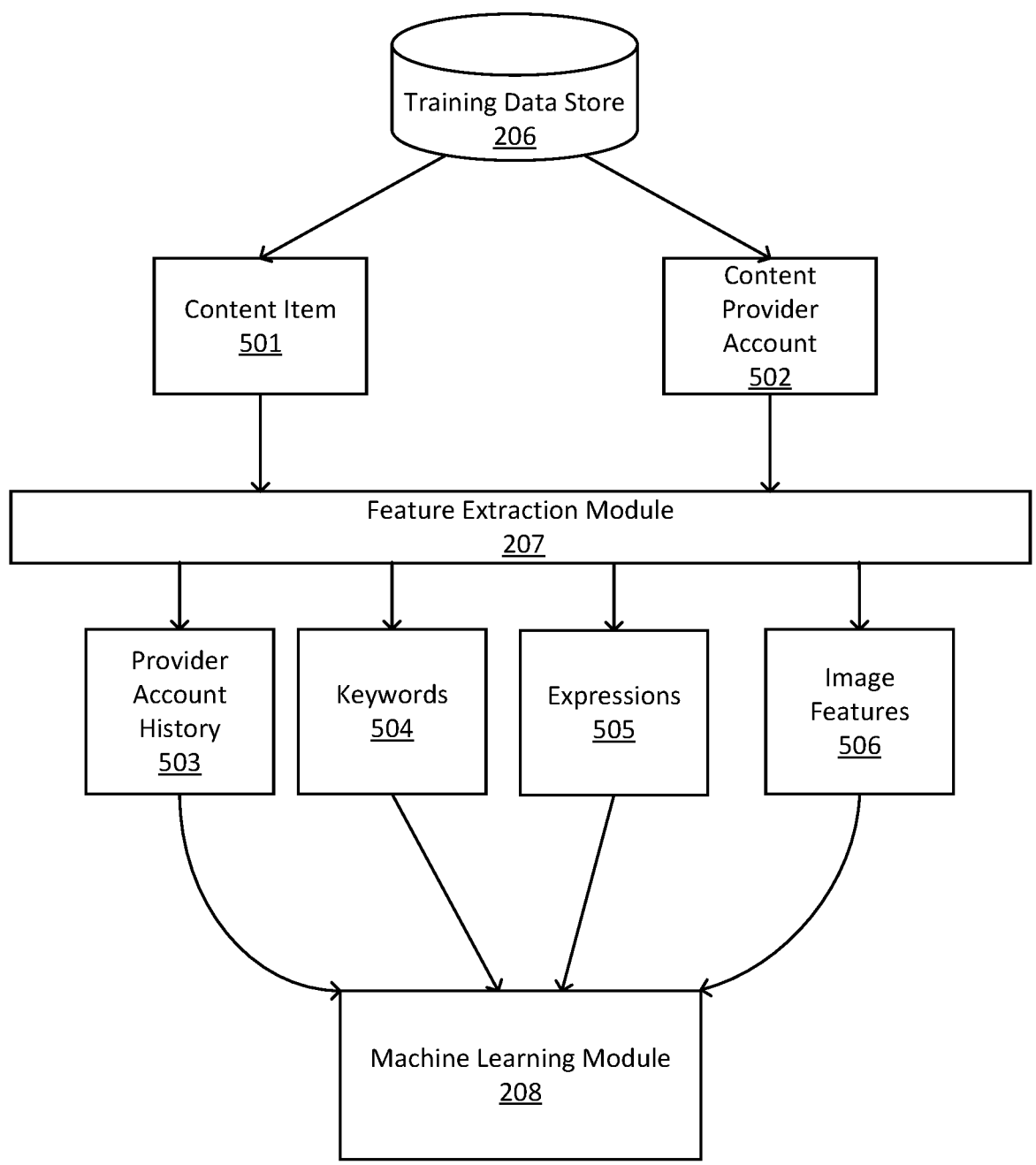
FIG. 5 is a flow chart of the machine learning training process, in accordance with an embodiment of the invention.

The feature extraction module 207 extracts various features of content items for training the prediction model or for predicting a score for a given content item in production. The features may describe the content items or the content providers of the content items. FIG. 5 further describes various types of features extracted by the feature extraction module 207.

The content ranking module 209 ranks search results based on various factors including the score generated by a prediction model indicating a probability of the content item violating a trademark. The search results generated by the trademark search module 205 are sent to the content ranking module 209 for ranking. In one embodiment, the content ranking module 209 separates content determined to be fraudulent from authorized content. Furthermore, the content ranking module 209 presents most relevant search results first, followed by less relevant results, thereby providing the search results in order of relevance to the trademark owner device. The content ranking module 209 is further described below in conjunction with FIG. 4.

In one embodiment, the online system sends the search results ranked by the content ranking module 209 to the trademark owner for review, wherein a trademark owner manually sorts through search results and flags them as fraudulent/deceptive or authorized/authentic. Content deemed fraudulent is then indicated as such to the content distribution module 122, which is further described below.

In an embodiment, the trademark search module 205 exempts authorized content from being returned by subsequent searches performed by the content-providing client pertaining to the specific trademark in question. For example, if Brand X performs a search for material related to the Trademarked Design 1 and deems certain content to be non-fraudulent, the trademark search module 205 withholds the content from subsequent searches and does not provide it as search results. However, if Brand X performs a search for material related to the Trademarked Design 2, the exempt content would not be exempt from this search and would have to be labeled as authorized to use Trademarked Design 2 as well.

A blacklist may comprise specific content items or information identifying content providers, for example, user accounts of the content providers. If a content provider is black listed, the trademark search module 205 withholds all content from the content provider from subsequent searches. If a content item is blacklisted the trademark search module 205 withholds all content from the content provider from subsequent searches. Accordingly, subsequent searches do not return the withheld content items as search results in response to subsequent searches from the trademark owner. In an embodiment, if a content item is white listed, the trademark search module 205 withholds the content item from subsequent searches, because the content item has been reviewed and determined to be authorized. Accordingly, there is no need to show the content item in subsequent searches. Similarly if a trademark owner marks a content provider as authorized, the content provider is white listed and the trademark search module 205 does not return content items from the white listed content provider as search results in response to subsequent searches.

The online system associates black lists and white lists with a particular scope. For example, the trademark search module 205 may create a black/white list for a particular trademark. Accordingly, the trademark search module 205 withholds the corresponding content items from searches for that specific trademark. As another example, the online system may associate black lists and white lists with a trademark owner. Accordingly, the trademark search module 205 withholds the corresponding content items from searches for all trademarks of that trademark owner. As another example, the online system may make certain black lists and white lists global. Accordingly, the trademark search module 205 withholds the corresponding content items from searches for all trademarks of all trademark owners.

Associating a black/white list with a scope allows a trademark owner to specify the type of search results returned by trademark searches. In an embodiment, if the trademark search module 205 determines that a content provider violates only a particular trademark, the trademark search module 205 blacklists the content provider for that particular trademark. If the trademark search module 205 determines that a content provider violates more than a threshold number of trademarks of a trademark owner, the trademark search module 205 blacklists the content provider for that particular trademark owner. If the trademark search module 205 determines that a content provider violates trademarks of more than a threshold number of trademark owners, the trademark search module 205 adds the content provider to a global blacklist.

Similarly, if the trademark search module 205 determines that a content provider is determined to be authorized with respect to search for a particular trademark, the trademark search module 205 white lists the content provider for that particular trademark. If the trademark search module 205 determines that a content provider is authorized for more than a threshold number of trademarks of a trademark owner, the trademark search module 205 whitelists the content provider for that particular trademark owner. If the trademark search module 205 determines that a content provider is authorized for more than a threshold number of trademark owners, the trademark search module 205 adds the content provider to a global white list.

In an embodiment, the trademark search module 205 recommends content providers or content items for being black/white listed and takes appropriate action responsive to receiving a confirmation from a user, for example, an administrator of the trademark owner. The trademark search module 205 continues to return content items of content providers in search results if the content items or corresponding content providers are neither white listed nor blacklisted for a particular scope. Accordingly, a trademark owner can continue to review the content items and content providers that have not been reviewed and determining whether to add them to a white list or a black list.

The content distribution module 122 determines whether to provide content from a content provider to users based on the black lists or white lists. For example, if the content item is blacklisted for more than a threshold number of trademarks or trademark owners, the content distribution module 122 may block all content items of the content providers from users of the online system. Similarly, if a content provider is white listed for more than a threshold number of content providers, the content distribution module 122 may increase the rate at which content items of the content provider are provided to users since the content provider provides authorized content.

After confirming who is legally entitled to the rights in the trademark, the online system records and saves parameters and terms by which they would like to search in the content store 202, a database of content officially related to the trademark in questions. Such information may include, but is not limited to, images of the trademark in media, image hatches of the trademark on products, text associated with the trademark and text associated with promotions implicating the trademark.

Once verified, the online system saves information specifically relating to the trademark in question in the trademark store 204. Such information may include, but is not limited to, designs of the trademark and proof of licensing for the trademark. If a trademark owner has multiple trademarks registered under their name, information for the trademarks is stored within the trademark store 204.

Content Provider Verification

In one embodiment, the online system may require verification from trademark owner, before allowing a content search to be performed. In the embodiment, the online system requires proof of the trademark's registration from trademark owner which can be provided through a Certificate of Trademark Registration, referred to herein as "certification," as issued by the USPTO. After successful verification, trademark owner is able to conduct their search. However, if a content provider does not have the certification and the verification is unsuccessful, that provider is unable to perform the search.

Figure 3:
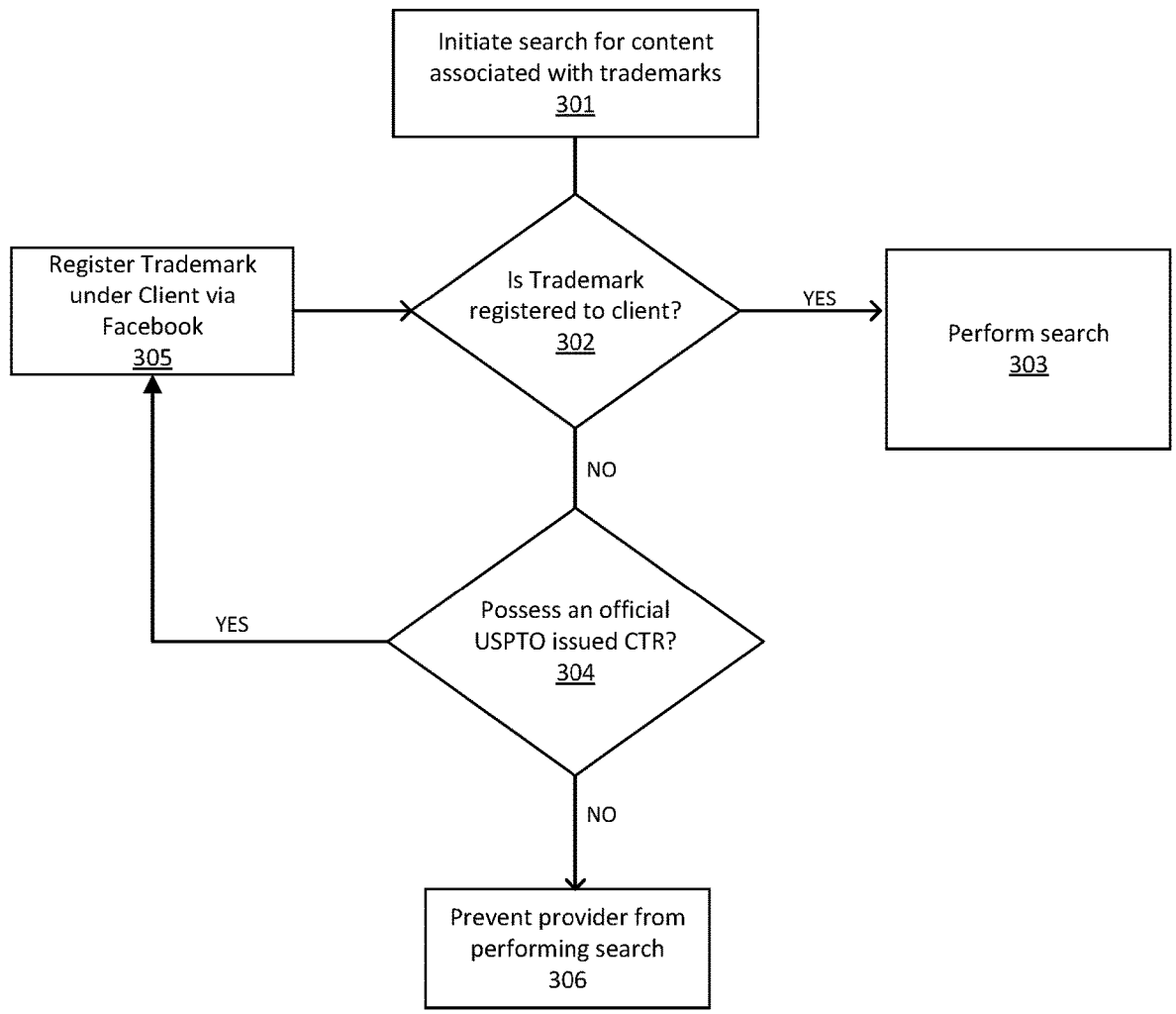
FIG. 3 is a flow chart of a trademark owner verification process, in accordance with an embodiment of the invention.

FIG. 3 illustrates a flow chart of one embodiment of a method 300 for verifying that trademark owner has a legal claim to the rights in the trademark. In the embodiment shown in FIG. 3, a 301 request to search for content associated with a trademark of interest is placed. Before proceeding with the search, with intent to verify trademark owner, the module will check 302 whether or not the trademark has been registered to the owner. Registration of the trademark can only be done by providing confidential registration information in the form of a certification. Once confirmed, the aforementioned search will be 303 performed. In some embodiments, registration is performed manually by the trademark owner. In other embodiments, the online system 120 executes an application program interface (API) call to retrieve information needed to confirm registration of the trademark from an external system. The online system may make the API call to of the US Patent Office website or the US Copyright Office website or any other service that provides the required information. The online system 120 receives an identifier of the trademark or the copyright, for example, a serial number of the trademark or copyright that uniquely identifies the corresponding trademark or copyright. The online system 120 provides the identifier of the trademark or the copyright as input to the API call to the external system and receives information verifying the ownership of the trademark/copyright. In an embodiment, the API call takes an identifier of the trademark/copyright and return a data structure comprising information identifying the owner. In another embodiment, the API call takes the identifier of the trademark/copyright and information identifying an input owner and returns a boolean value that is true if the input owner is the owner of the input trademark/copyright, and false otherwise.

In one embodiment, owner may perform a search for the first time. At that time, if not already registered prior, trademark owner must confirm 304 that they possess an official certification. Upon confirmation, owner will be given an opportunity to register 305 the trademark under their account, before proceeding with the search. However, in the event that the content provider is fraudulent and does not have access to the official certification, they will be unable to perform 305, resulting in being prevented 306 from performing that specific search.

Content Ranking System

Figure 4:
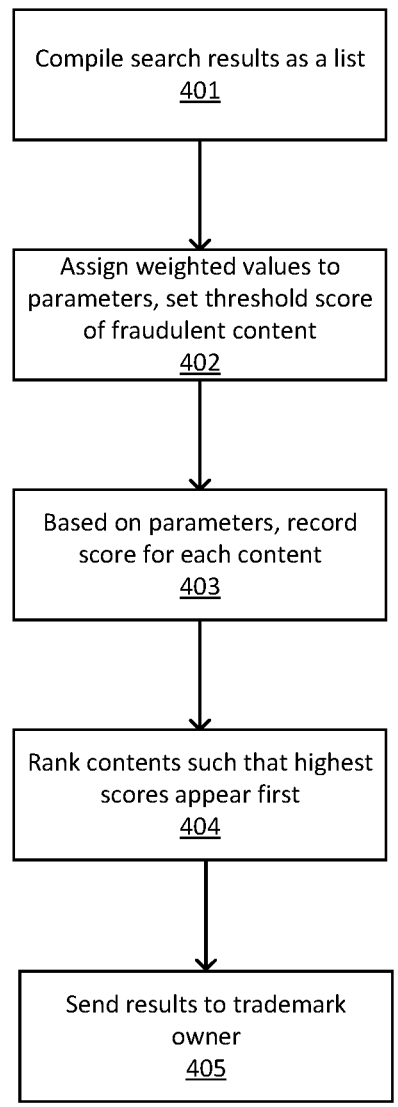
FIG. 4 is a flow chart of a content ranking process, in accordance with an embodiment of the invention.

FIG. 4 illustrates a flow chart of one embodiment of a method 400 for performing the ranking of discovered content. First, results are compiled 401 into a comprehensive list of content items that were deemed relevant based on selected search parameters. The parameters are assigned 402 weighted values depending on importance. For example, if text matching a slogan and sales of 90% off items were two parameters, but the 90% off sale parameter was considered to be more significant, that parameter would be given a more significant weight than the slogan parameter. As a result, the machine learning algorithm, described in greater detail below, would score content promoting a 90% off sale with no mention of the slogan higher than content using the slogan with no mention of the 90% off sale.

Additionally, owner sets 402 a threshold score such that any content scoring to low during the search need not be reviewed or ranked. The machine learning algorithm assigns each listed profile a score based on the presence of these weighted parameters and ranks 404 those profiles from high scores to low scores, indicating the highest scoring profiles as possibly fraudulent. Once the ranking has been completed, the list is made 407 available to the trademark owner for review.

The content ranking module ranks content items based on several factors that determine relevance of the content item to the trademark owner. Factors considered by the content ranking module to determine relevance include a number of impressions of the content item. An impression corresponds to an instance of the content item being sent to a client device for presentation to a user. An impression may also correspond to an instance of the content item being presented via the client device such that the content item is viewed by the user as reported by the client device to the online system. Large number of impressions indicates that the content item is being viewed by a large number of users and if the content item deceptively/fraudulently uses a trademark of another trademark owner, the content item is significant for the trademark owner to identify and blacklist. Another factor considered by the content ranking module for ranking content items based on relevance include a measure of a number of conversions associated with a content item. A conversion indicates a user interaction associated with the content item that a user may perform responsive to viewing the content item. For example, a conversion may correspond to a user visiting a website associated with the content item responsive to viewing the content item, registering with a website responsive to viewing the content item, making a purchase via a third party website responsive to viewing the content item, and so on. The online system may receive tracking signals from client device describing user interactions performed by the client device with third party websites responsive to displaying the content item by the client device. Trademark owner may control how these relevancy parameters, suggested by the online system, are weighted in comparison to their own search parameters.

Trademark owner reviews the generated list and identifies content items or content providers that they determine to be fraudulent or content items or content providers that they determine to be authentic. These flags are received by the online system as input for the content distribution module 124. The content distribution module may adjust content distribution of content items based on the feedback, for example, by reducing rate at which content of a content provider is distributed or completely blocking content item from content providers that are black listed or increasing rate at which content items are distributed from content providers that are white listed. The trademark search module also uses the information describing black lists and white lists by eliminating content items from content providers that have been marked as black listed or white listed since these content providers are already reviewed.

Machine Learning Model

FIG. 5 is a flow chart 500 illustrating the interactions between various types of data stored in an online system 120 for training a machine learning model 208. The feature extraction module 207 extracts features from the training data store 206 labelled content items marked as known to violate a trademark or known to not violate any trademark. The machine learning module 208 receives the features extracted by the feature extraction module 207. The machine learning module 208 invokes the feature extraction module 207 to extract features from the content items 501 and corresponding content provider accounts 502 that provided the content item. In one embodiment, these features include, but are not limited to, the content item provider's account history 503, keywords 504 and expressions 505 included in the content item, and image features 506. In an embodiment, the machine learning module 208 stores a list of keywords that are known to occur frequently in content items that were previously determined to violate trademarks. For example, content items that violate trademarks often include attention grabbing keywords and phrases such as "great", "awesome", "closing out sale" and the like. The list of keywords may be provided by an expert user or automatically extracted by the online system from content items previously known to violate trademarks and/or reviewed by an expert user. The feature extraction module 207 extracts a feature score for a feature indicating a frequency of occurrence of keywords that match the keywords of the list in a content item. A high frequency of occurrence of such attention grabbing keywords indicates a high likelihood of the content item including deceptive information and therefore high likelihood of violating trademarks.

In an embodiment, the feature extraction module 207 identifies sentences of text in the content item that includes keywords or phrases from the list, for example, "discount" and "sale". The feature extraction module 207 further determines whether these sentences include a numeric value associated with the keywords, for example, "80% discount." The feature extraction module 207 determines a feature score based on the numeric value associated with the keywords. For example, if the numeric value indicates a large discount value, the feature extraction module 207 assigns a high score indicating that the feature indicates that the content item is likely to include deceptive information and therefore more likely to violate a trademark. Examples of image features 506 include, but are not limited to, brand images, attention-grabbing images, or bright colors.

An example of account history 503 of a content provider include previous instances of trademark violations. In an embodiment, the feature extraction module 207 determines a feature score based on an aggregate value based on scores of content items provided by the content provider indicating an overall likelihood of content items of the content provider violating trademarks.

In an embodiment, the machine learning module 208 generates and executes a prediction model that assigns a score based on the features of content item 501 and content provider owner account 502. In one embodiment, the machine learning module 208 periodically retrains itself for accuracy at a determined frequency of time using various features from known authentic and counterfeit accounts.

Figure 6:
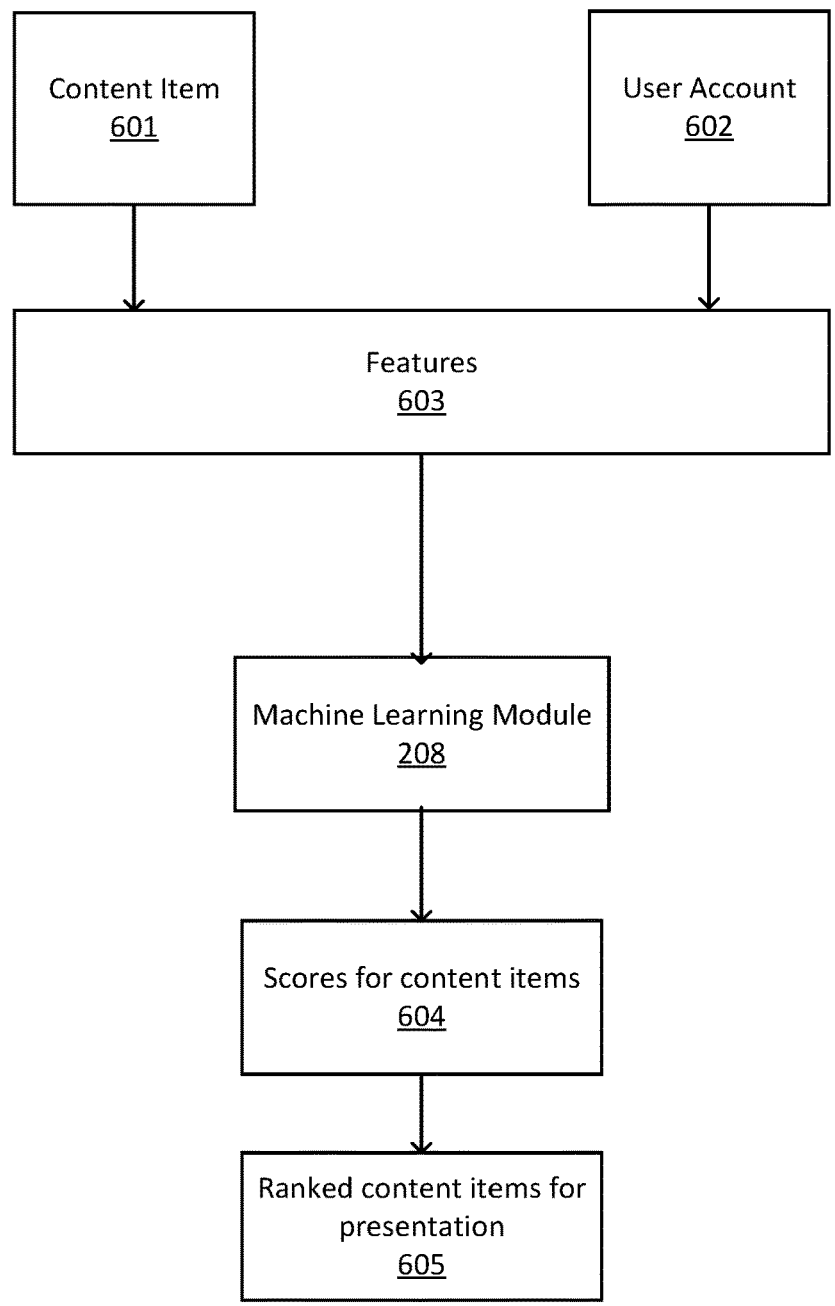
FIG. 6 is a flow chart of the content scoring process, in accordance with an embodiment of the invention.

FIG. 6 is a flow chart illustrating the method of ranking content items based on scores generated by machine learning module 208. The online system receives a set of new content items 601 that match a search request from a trademark owner. The feature extraction module 207 extracts features 603 from the content items 610 and corresponding content provider accounts 602. The machine learning module 208 receives the extracted features.

In one embodiment, the machine learning module 208 determines scores 604 for the content items 601. The machine learning module 208 provides the scores 604 to the content ranking module 209. The content ranking module 209 ranks the content items based on various factors including the scores. The content ranking module 209 creates a ranked list 605 of content items for presentation to the trademark owner 110a.

Application of Trademark Verification System

Figure 7:
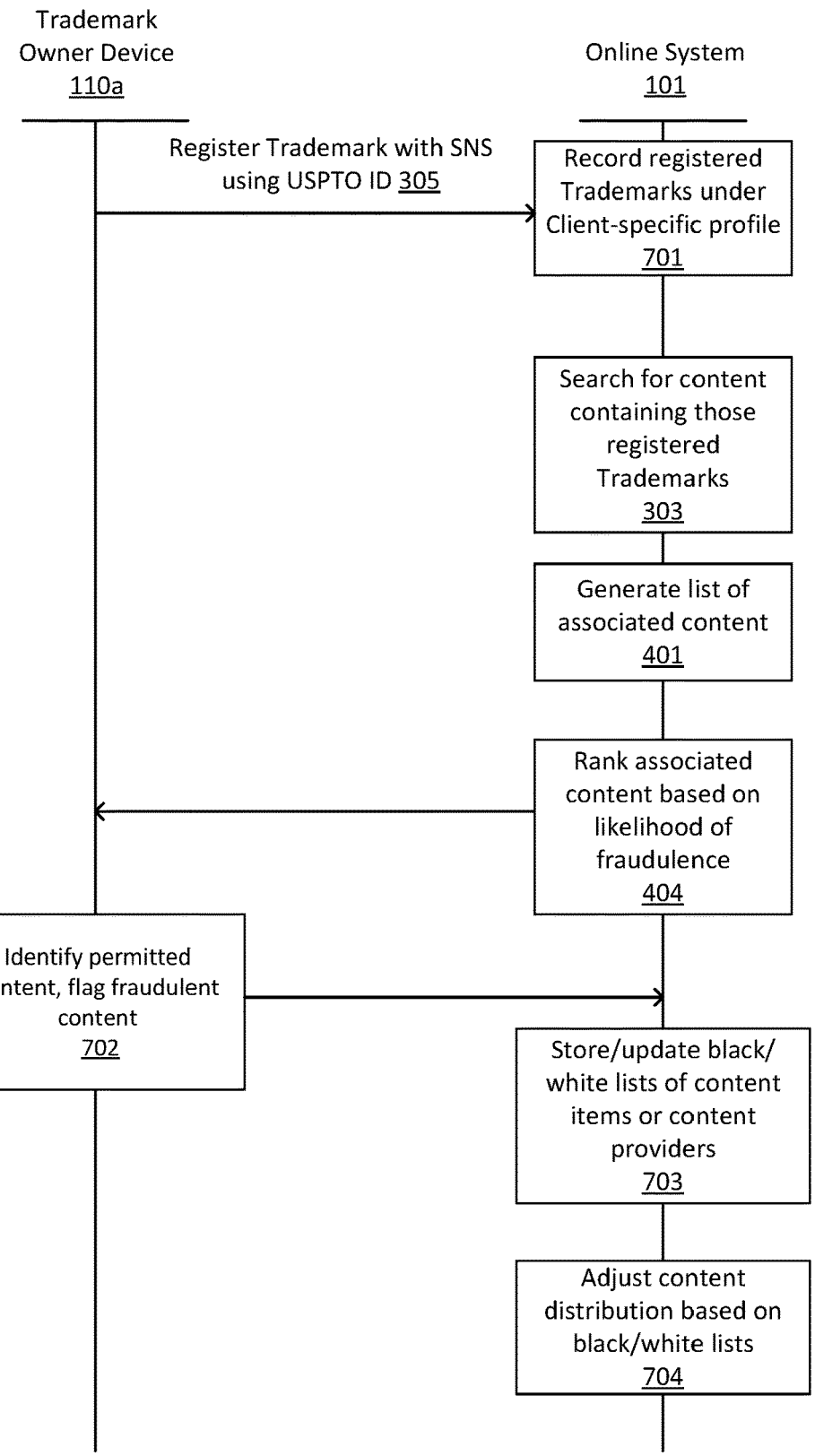
FIG. 7 is an interaction diagram of a content verification and notification process, in accordance with an embodiment of the invention.

FIG. 7 shows an interaction diagram of the content verification and notification process between the trademark owner device 110a and the online system 101. The diagram presents a consolidated view of overall process of the invention. The trademark owner registers 305 the trademark with the online system using their official certification and the online system records 501 this trademark with other trademarks in the trademark store 203. The trademark owner searches 303 for content containing those search parameters and content guidelines stored in the content store 202 and generates 401 a list of associated content. The content ranking module ranks 404 any suspicious content for confirmation from the trademark owner. The trademark owner flags 502 content determined to be fraudulent or counterfeit and notifies the system of these tagged profiles. Finally, after receiving confirmation on fraudulent pages from the trademark system, the online system stores or updates information describing black lists or white lists of content items or content providers. The online system takes 505 appropriate action against fraudulent content, consistent with their own policies and agreements, for example, by blocking content items that are black listed.

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
receiving, by an online system from a trademark owner associated with an account in the online system, a request to perform a search for content items stored by the online system that are likely to violate a given trademark;
responsive to receiving a selection of one or more search terms associated with the trademark, determining, by the online system, search results based on the received selection of search terms, wherein each search result represents a content item that matches at least one of the received selection of search terms;
for each content item of the search results,
extracting one or more features from the content item, the one or more features comprising a frequency of occurrence of keywords of the content item matching keywords in a predefined list;
inputting the extracted one or more features into a classifier based machine learning model configured to output a score representing a measure of likelihood that the content item violates the given trademark, the machine learning model trained using training dataset based on content items determined to violate trademarks and content items determined to be authentic;
generating, by the machine learning model, a score based on the extracted one or more features input to the model;
receiving tracking signals from user devices on which the content item was displayed, wherein each tracking signal indicates an interaction between a user device and a third party website associated with the content item;
ranking the search results based on relevance of each search result to the trademark owner, the relevance for each search result determined based on factors comprising the score generated by the machine learning model for the content item identified as the search result and tracking signals indicating interactions between user devices and third party websites associated with the content item identified as the search result;
sending a subset of relevant content items of the search results to a device operated by the trademark owner for presentation to a trademark owner, the subset of relevant content items determined based on the ranking;
receiving, from the trademark owner device, a selection of one or more content items of the subset of relevant search results, the selection confirming content items that violate the given trademark;
identifying, for each selected content item, a content provider who provided the content item to the online system; and
adjusting distribution of one or more other content items provided by each identified content provider to users of the online system.

2. The computer-implemented method of claim 1, wherein the one or more features extracted from the content item comprise a frequency of occurrence of keywords extracted from the content item that match a list of predefined keywords extracted from content items previously determined to violate trademarks.

3. The computer-implemented method of claim 1, wherein the one or more features extracted from the content item comprise a numeric value in association with a keyword that occurs in a list of predefined keywords extracted from content items previously determined to violate trademarks.

4. The computer-implemented method of claim 1, wherein the one or more features extracted from the content item comprise a type of color occurring in images of the content item.

5. The computer-implemented method of claim 1, further comprising:
verifying that the trademark owner is entitled to the given trademark, the verification comprising:
accessing information associated with an account of the trademark owner to whom the trademark is registered; and
determining that trademark owner is entitled to the trademark based on trademark registration history.

6. The computer-implemented method of claim 5, wherein determining that the trademark owner is entitled to the trademark further comprises:
accessing a Certificate of Federal Registration from a website of the United States Patent and Trademark Office.

7. The computer implemented method of claim 3 wherein the oneline system generates suggested search terms based on information associated with the content stored within the trademark owner's account.

8. The computer implemented method of claim 1, wherein the ranking of the search results is further based on a number of times each content item of the search results was presented to users of the online system.

9. The computer-implemented method of claim 1 further comprising: adding each identified content provider to a black list; and eliminating content items received from each content provider on the black list from search results returned to the trademark owner during subsequent searches.

10. The computer-implemented method of claim 1 further comprising:
receiving, from the trademark owner, a selection of a set of content items of the search results that are identified as not violating any trademarks;
identifying a content provider of each content item of the selected set;
adding the identified content provider to a white list;
eliminating content items received from each content provider on the white list from search results returned to the trademark owner during subsequent searches.

11. A non-transitory computer readable medium configured to store instructions, the instructions when executed by a processor cause the processor to perform steps comprising:
receiving, by an online system from a trademark owner associated with an account in the online system, a request to perform a search for content items stored by the online system that are likely to violate a given trademark;
responsive to receiving a selection of one or more search terms associated with the trademark, determining, by the online system, search results based on the received selection of search terms, wherein each search result represents a content item that matches at least one of the received selection of search terms;
for each content item of the search results,
extracting one or more features from the content item, the one or more features comprising a frequency of occurrence of keywords of the content item matching keywords in a predefined list;
inputting the extracted one or more features into a classifier based machine learning model configured to output a score representing a measure of likelihood that the content item violates the given trademark, the machine learning model trained using training dataset based on content items determined to violate trademarks and content items determined to be authentic;
generating, by the machine learning model, a score based on the extracted one or more features input to the model;
receiving tracking signals from user devices on which the content item was displayed, wherein each tracking signal indicates an interaction between a user device and a third party website associated with the content item;
ranking the search results based on relevance of each search result to the trademark owner, the relevance for each search result determined based on factors comprising the score generated by the machine learning model for the content item identified as the search result and tracking signals indicating interactions between user devices and third party websites associated with the content item identified as the search result;
receiving, from the trademark owner device, a selection of one or more content items of relevant search results, the selection confirming content items that violate the given trademark;
identifying, for each selected content item, a content provider who provided the content item to the online system; and
adjusting distribution of one or more other content items provided by each identified content provider to users of the online system.

12. The non-transitory computer readable medium of claim 11, wherein the one or more features extracted from the content item comprise a frequency of occurrence of keywords extracted from the content item that match a list of predefined keywords extracted from content items previously determined to violate trademarks.

13. The non-transitory computer readable medium of claim 11, wherein the one or more features extracted from the content item comprise a numeric value extracted from a sentence including one or more predetermined keywords.

14. The non-transitory computer readable medium of claim 11, wherein the instructions further cause the processor to perform steps comprising: adding each identified content provider to a black list; and eliminating content items received from each content provider on the black list from search results returned to the trademark owner during subsequent searches.

15. The non-transitory computer readable medium of claim 11, wherein the instructions further cause the processor to perform steps comprising:
receiving, from the trademark owner, a selection of a set of content items of the search results that are identified as not violating any trademarks;
identifying a content provider of each content item of the selected set;
adding the identified content provider to a white list;
eliminating content items received from each content provider on the white list from search results returned to the trademark owner during subsequent searches.

16. A computer system comprising:
a processor; and
a non-transitory computer readable medium configured to store instructions, the instructions when executed by the processor cause the processor to perform steps comprising:
receiving, by an online system from a trademark owner associated with an account in the online system, a request to perform a search for content items stored by the online system that are likely to violate a given trademark;
responsive to receiving a selection of one or more search terms associated with the trademark, determining, by the online system, search results based on the received selection of search terms, wherein each search result represents a content item that matches at least one of the received selection of search terms;
for each content item of the search results,
extracting one or more features from the content item, the one or more features comprising a frequency of occurrence of keywords of the content item matching keywords in a predefined list;
inputting the extracted one or more features into a classifier based machine learning model configured to output a score representing a measure of likelihood that the content item violates the given trademark, the machine learning model trained using training dataset based on content items determined to violate trademarks and content items determined to be authentic;

generating, by the machine learning model, a score based on the extracted one or more features input to the model:

receiving tracking signals from user devices on which the content item was displayed, wherein each tracking signal indicating an interaction between a user device and a third party website associated with the content item;

ranking the search results based on relevance of each search result to the trademark owner, the relevance for each search result determined based on factors comprising the score generated by the machine learning model for the content item identified as the search result and tracking signals indicating interactions between user devices and third party websites associated with the content item identified as the search result;

sending a subset of relevant content items of the search results to a device operated by the trademark owner for presentation to a trademark owner;

receiving, from the trademark owner device, a selection of one or more content items of the subset of relevant search results, the selection confirming content items that violate the given trademark;

identifying, for each selected content item, a content provider who provided the content item to the online system; and adjusting distribution of one or more other content items provided by each identified content provider to users of the online system.

* * * * *

UNITED STATES PATENT AND TRADEMARK OFFICE
CERTIFICATE OF CORRECTION

PATENT NO. : 11,004,164 B2
APPLICATION NO. : 15/796659
DATED : May 11, 2021
INVENTOR(S) : Sean M. Lantz et al.

Page 1 of 1

It is certified that error appears in the above-identified patent and that said Letters Patent is hereby corrected as shown below:

In the Claims

In Column 14, Claim 7, Line 64, delete "computer implemented" and insert -- computer-implemented --, therefor.

In Column 14, Claim 7, Line 65, delete "oneline" and insert -- online --, therefor.

In Column 15, Claim 8, Line 1, delete "computer implemented" and insert -- computer-implemented --, therefor.

In Column 15, Claim 9, Line 5, delete "claim 1" and insert -- claim 1, --, therefor.

In Column 15, Claim 10, Line 10, delete "claim 1" and insert -- claim 1, --, therefor.

Signed and Sealed this
Fifth Day of October, 2021

Drew Hirshfeld
*Performing the Functions and Duties of the
Under Secretary of Commerce for Intellectual Property and
Director of the United States Patent and Trademark Office*